US012560248B2

(12) United States Patent
Mikosiak

(10) Patent No.: US 12,560,248 B2
(45) Date of Patent: Feb. 24, 2026

(54) PNEUMATIC VALVE, SYSTEM, AND VEHICLE

(71) Applicant: ZF CV Systems Global GmbH, Bern (CH)

(72) Inventor: Izabela Mikosiak, Wroclaw (PL)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/641,855

(22) Filed: Apr. 22, 2024

(65) Prior Publication Data

US 2024/0360908 A1 Oct. 31, 2024

(30) Foreign Application Priority Data

Apr. 28, 2023 (EP) ..................................... 23170559

(51) Int. Cl.
| | |
|---|---|
| *F16K 15/02* | (2006.01) |
| *B60T 11/28* | (2006.01) |
| *B60T 15/02* | (2006.01) |
| *F16K 11/04* | (2006.01) |
| *F16K 11/044* | (2006.01) |

(52) U.S. Cl.
CPC ............. *F16K 11/044* (2013.01); *B60T 11/28* (2013.01); *B60T 15/02* (2013.01); *F16K 15/02* (2013.01)

(58) Field of Classification Search
CPC .... F16K 11/044; F16K 15/02; F16K 11/0712; F16K 11/022; F16K 11/0445; F16K 15/1402; B60T 11/28; B60T 15/02; B60T 13/24; B60T 13/26; B60T 15/36; B60G 17/0523; Y10T 137/7866; Y10T 137/784; Y10T 137/7843
See application file for complete search history.

(56) References Cited

U.S. PATENT DOCUMENTS

| | | | | |
|---|---|---|---|---|
| 1,686,310 A | * | 10/1928 | Beebe | ................... F16K 11/044 137/516.25 |
| 3,604,451 A | * | 9/1971 | Delamater | .......... F16K 15/1402 137/516.25 |
| 4,281,677 A | * | 8/1981 | Hoffman | ................. B60T 17/18 303/84.1 |
| 5,590,936 A | | 1/1997 | Reuter | |
| 6,662,819 B1 | * | 12/2003 | Watson | ................. F17C 13/045 137/113 |

(Continued)

FOREIGN PATENT DOCUMENTS

| | | | |
|---|---|---|---|
| DE | 102015112490 A1 | 2/2017 | |
| DE | 102022107781 A1 | 10/2023 | |

(Continued)

*Primary Examiner* — Marina A Tietjen
(74) *Attorney, Agent, or Firm* — Dickinson Wright PLLC

(57) ABSTRACT

A valve (100) for a pneumatic system (250) of a vehicle (200a), in particular a utility vehicle (200b) includes a shuttle member (130) with a lip seal (132) integral with the shuttle member (130). The valve includes a cylinder (110), a pressure supply port (120) to supply pressurized air (150) to the cylinder (110), and the shuttle member (130) being movably arranged within the cylinder (110). The shuttle member (130) is adapted to be moved by the supply of the pressurized air (150). The shuttle member (130) includes the radial lip seal (132) integral with the shuttle member (130). The lip seal (132) and shuttle member (130) may be part of a one-piece elastic element (131).

17 Claims, 1 Drawing Sheet

(56)        References Cited

U.S. PATENT DOCUMENTS

| | | | | |
|---|---|---|---|---|
| 8,397,742 | B2 * | 3/2013 | Thrash .................. | F15B 13/028 |
| | | | | 137/111 |
| 10,344,890 | B2 * | 7/2019 | Merrill .................... | B64C 25/42 |
| 11,353,137 | B2 | 6/2022 | Scopesi | |
| 2010/0032036 | A1 * | 2/2010 | Quendt ................. | F15B 13/028 |
| | | | | 235/201 ME |
| 2011/0101772 | A1 | 5/2011 | Schepp et al. | |
| 2014/0239217 | A1 | 8/2014 | Ho et al. | |
| 2020/0378506 | A1 * | 12/2020 | Woods .................. | F16K 11/065 |
| 2022/0252165 | A1 * | 8/2022 | Harigovindan ......... | B60T 15/00 |
| 2022/0299122 | A1 * | 9/2022 | Shetty .................... | B64C 25/44 |
| 2022/0364654 | A1 * | 11/2022 | Kielczykowski ..... | F16K 11/044 |
| 2022/0410863 | A1 | 12/2022 | Csoma et al. | |

FOREIGN PATENT DOCUMENTS

| | | | |
|---|---|---|---|
| EP | 2059427 | B1 | 4/2011 |
| JP | H09206545 | A | 8/1997 |

* cited by examiner 200a,200b        250,251    100,101

150

100'     120'   105' 110'    111' 125'

A'

161' 163'   130'   162'     163' 112'

100,101     120   105     110    111 125

A 131,135        134

132    130   133   112

PNEUMATIC VALVE, SYSTEM, AND VEHICLE

FIELD

The disclosure relates to a valve for a pneumatic system of a vehicle, in particular a utility vehicle. The valve includes a cylinder; a pressure supply port to supply pressurized air to the cylinder, and a shuttle member being movably arranged within the cylinder. The shuttle member is adapted to be moved by the supply of the pressurized air. The disclosure further relates to a pneumatic system for a vehicle, in particular a utility vehicle, having the valve, and to a vehicle, in particular a utility vehicle, having the pneumatic system.

BACKGROUND

Double check valves are known in the prior art. Such a valve may include a so-called shuttle member, a cylinder, and an o-ring. The shuttle member is movably arranged within the cylinder. The shuttle member typically has a metal body and an overmolded rubber layer. The o-ring is used as a radial seal to seal the shuttle member from the cylinder. I.e., the shuttle member has at least two separate aspects: the shuttle member being made of a metal insert overmolded with rubber, and o-rings to provide a radial sealing. However, this may cause a risk of leakage if the o-rings are not firmly assembled. A risk of an unpredictable air flow may be caused if one or more of the o-rings is not fully tightened. Furthermore, during manufacture of the valve, detecting whether the o-rings have been mounted correctly may be difficult.

The main function of the shuttle member is to select a higher pressure to be delivered independently to two supply ports. For example, if a first pressure at the first supply port is larger than a second pressure at a second supply port, the shuttle member moves towards the second supply port and blocks the airflow from the second supply port.

Patent application DE 10 2022 107 781.0 describes a double check valve, a pneumatic braking system, and a vehicle, in particular a utility vehicle.

EP 20 59 427 B1 discloses a valve unit for an electro-pneumatic brake control device for controlling a vehicle brake, wherein the valve unit can be or is connected to a control input of an air-quantity-boosting valve device and is designed for the controllable aeration and deaeration of said valve device via its control input. To avoid a mechanical overuse of the brake mechanism designed as a shuttle valve or select high-valve, an overload protection valve is provided.

SUMMARY

The object of the disclosure is to provide a technological contribution to the art. An embodiment of the present disclosure provides a valve with an improved and cost-effective sealing between a shuttle member and a cylinder.

According to an aspect of the disclosure, a valve for a pneumatic system of a vehicle, in particular a utility vehicle, is provided. Therein, the valve includes: a cylinder; a pressure supply port to supply pressurized air to the cylinder; and a shuttle member being movably arranged within the cylinder, wherein the shuttle member is adapted to be moved by the supply of the pressurized air; wherein the shuttle member includes a radial lip seal being integrally formed with the shuttle member.

The disclosure provides an integrally formed, i.e., integrated radial lip seal. In other words, the lip seal and a surface of the shuttle member may be one-piece. Thus, the lip seal is fixedly arranged at and/or attached to the surface of the shuttle member. The radial lip seal is adapted to contact an inner surface of the cylinder and thus seal the shuttle member from the inner surface of the cylinder. Thus, the lip seal may perform the same function as a sub-assembly of a shuttle member with o-rings. Hence, the o-rings may be dispensed with.

The lip seal being integrally formed with the shuttle member provides that only the shuttle member needs to be arranged within the cylinder to assemble the valve. In contrast, in the prior art, the shuttle member and the o-rings need to be arranged within the cylinder to assemble the valve. The disclosure thus achieves a more efficient and thus cost-effective assembly of the valve.

By integrally forming the lip seal with the shuttle member, a proper assembly of the valve may be detected more reliably and efficiently, because a misarrangement of a component different from the shuttle member may be excluded. This may improve the sealing between the shuttle member and the cylinder. In particular, this may reliably reduce the risk of leakage as the radial shape of the lip seal helps to block the air flow from one port to the other.

Optionally, the shuttle member is a one-piece elastic element. The elasticity of the shuttle member thus defines the elasticity of the lip seal which influences the sealing performance. Thus, a single component shuttle member may be provided. The elastic element may provide the body and the sealing of the shuttle member. Thus, a core, e.g., a metal core, may be dispensed with to enable a more cost-effective manufacture of the shuttle member. Alternatively, the shuttle member may comprise a body with a core, in particular a metal core.

Optionally, the cylinder defines an axial direction, and the shuttle member includes a second radial lip seal being separated, in the axial direction, from the lip seal. Thus, the shuttle member may comprise two lip seals being arranged with a certain distance, in the axial direction, from each other. This may enable a more balanced sealing and prevent tilting of the shuttle member within the cylinder and may thus improve the performance of the valve.

Optionally, the lip seal is circumferentially arranged and protrudes from a cylinder surface of the shuttle member towards the cylinder. The cylinder surface, i.e., lateral surface, of the shuttle member may be a circumferential surface. The cylinder surface faces the inner surface of the cylinder. The radially protruding lip seal may protrude from the cylinder surface towards to inner surface and may contact the inner surface to provide sealing.

Optionally, the shuttle member is made of rubber. The rubber shuttle member may enable that the surface of the shuttle member and the lip seal are integrally formed. The rubber shuttle member may further enable that the shuttle member is a one-piece component. Rubber may enable an efficient and cost-effective manufacture of the shuttle member, e.g., by injection molding.

Optionally, the valve is a double check valve. The double check valve may enable selecting a higher pressure being delivered by one of two supply ports. Therein, the shuttle member may move within the cylinder so as to block one of the supply ports.

According to an aspect of the disclosure, a pneumatic system for a vehicle, in particular a utility vehicle, is provided. The pneumatic system includes the valve as described above. Optionally, the valve includes one or more of the above-described optional features to achieve a corresponding technical effect.

Optionally, the pneumatic system is a pneumatic braking system. This may be a particular useful application for such a valve. The pneumatic braking system may advantageously benefit from the improved sealing of the valve. Therein, the pneumatic valve may be an axle pressure control valve to control the pressure in a braking chamber of the axle. Therein, there may be two supply ports between which the valve may be functionally provided to select air from the supply port with the larger pressure. Even if the difference between the pressures from the supply ports is not significant, leakage may be prevented with the valve, since the o-rings of the prior art as a potential origin of the leakage are not present.

In other embodiments, the pneumatic valve may be used in other pneumatic systems, such as a pneumatic suspension system and/or a pneumatically actuated transmission system.

According to an aspect of the disclosure, a vehicle, in particular a utility vehicle, is provided. The vehicle, in particular a utility vehicle, includes the pneumatic system as described above. Optionally, the pneumatic system and/or the valve of the pneumatic system includes one or more of the above-described optional features to achieve a corresponding technical effect.

Further technical features and their technical effects are disclosed in the figures and the description thereof.

DETAILED DESCRIPTION

Figure 1:
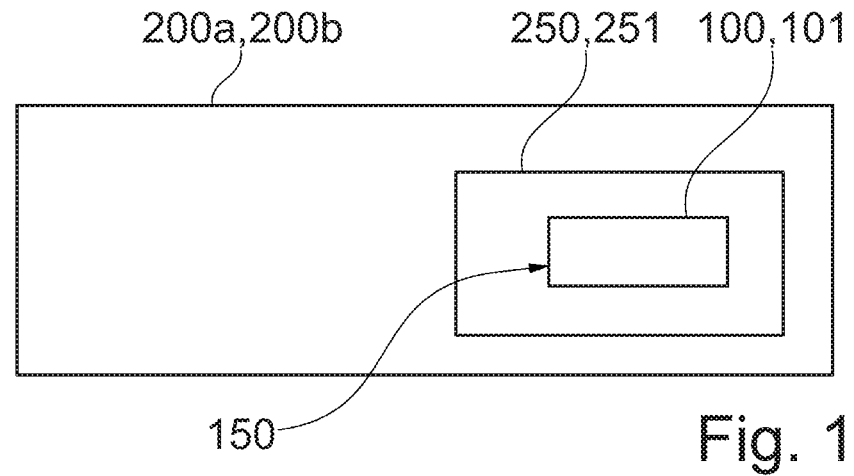
FIG. 1 is a schematic of a vehicle, in particular a utility vehicle, according to an embodiment of the disclosure.

FIG. 1 shows a schematic of a vehicle 200*a*, in particular a utility vehicle 200*b*, according to an embodiment of the disclosure. In the following, the vehicle 200*a*, in particular the utility vehicle 200*b*, is referred to as vehicle 200*a*, 200*b*. The vehicle 200*a*, 200*b* is a land-vehicle. The vehicle 200*a*, 200*b* may be a truck, a bus, and/or a trailer.

The vehicle 200*a*, 200*b* includes a pneumatic system 250. The pneumatic system 250 is a pneumatic braking system 251. The pneumatic braking system 251 is adapted to apply a braking force to decelerate one or more wheels (not shown) of the vehicle 200*a*, 200*b*.

The pneumatic system 250 includes a valve 100. The pneumatic system 250 is adapted to supply pressurized air 150 to the valve 100. The valve 100 is a double check valve 101.

The valve 100 is further described with reference to FIG. 3.

Figure 2:
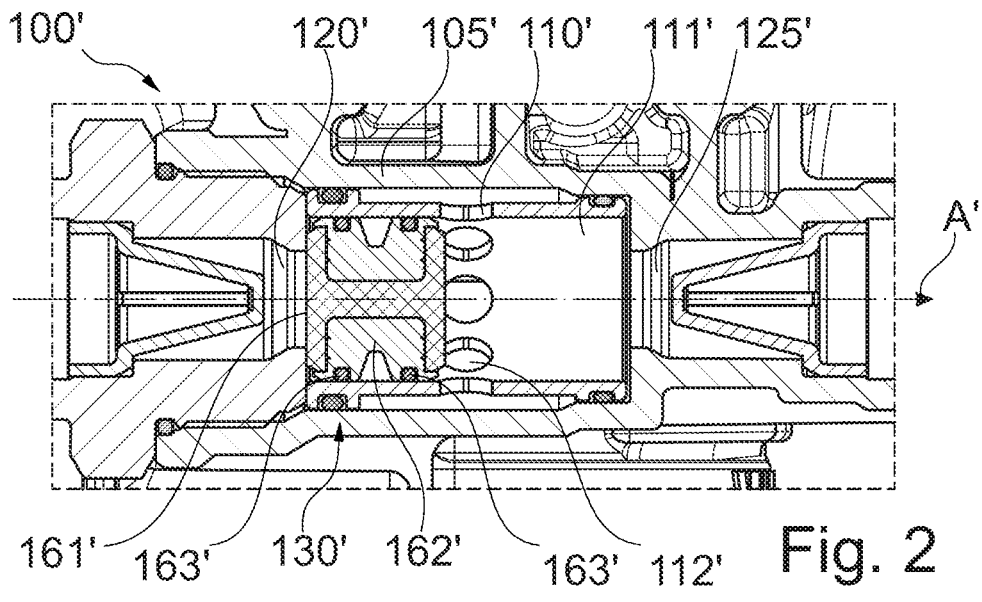
FIG. 2 is a cross-sectional view of a valve with a multi-piece shuttle member including o-rings.

FIG. 2 shows a cross-sectional view of a valve 100'.

The valve 100' comprises a body 105' and a cylinder 110'. The cylinder 110' is arranged within the body 105'.

The valve 100' includes a pressure supply port 120', a second supply port 125' and a control section 112'. Each of the supply port 120' and the second supply port 125' is adapted to inject pressurized air 150 (FIG. 1) into the cylinder 110' and in particular into the control section 112'. The control section 112' may also be called a control chamber, control room, or control path. Each of the supply port 120' and the second supply port 125' includes a nozzle (not indicated) to concentrate the application of pressurized air 150.

The cylinder 110' defines an axial direction A. In the axial direction A, the cylinder 110' is arranged between the supply port 120' and the second supply port 125'. The control section 112' is arranged, in the axial direction A', in a middle section (not indicated) of the cylinder 110', i.e., between the supply port 120' and the second supply port 125'.

The valve 100' includes a shuttle member 130' being movably arranged within the cylinder 110'. The functioning of the shuttle member 130' and of the valve 100' in response to pressurized air is similar to that described with reference to valve 100 and shuttle member 130 of FIG. 3.

The shuttle member 130' according to the valve as shown in FIG. 2 includes a rubber part 161', a metal part 162', and two o-rings 163'. The rubber part 161' extends, along the axis A, entirely through the shuttle member 130'. The rubber part 161' is overmolded over the metal part 162'. The metal part 162' includes two circumferentially extended and axially separated recesses (not indicated). In each of the recesses, one of the o-rings 163' is arranged. The o-rings 163' are adapted to contact an inner surface 111' of the cylinder 110' to provide sealing.

Figure 3:
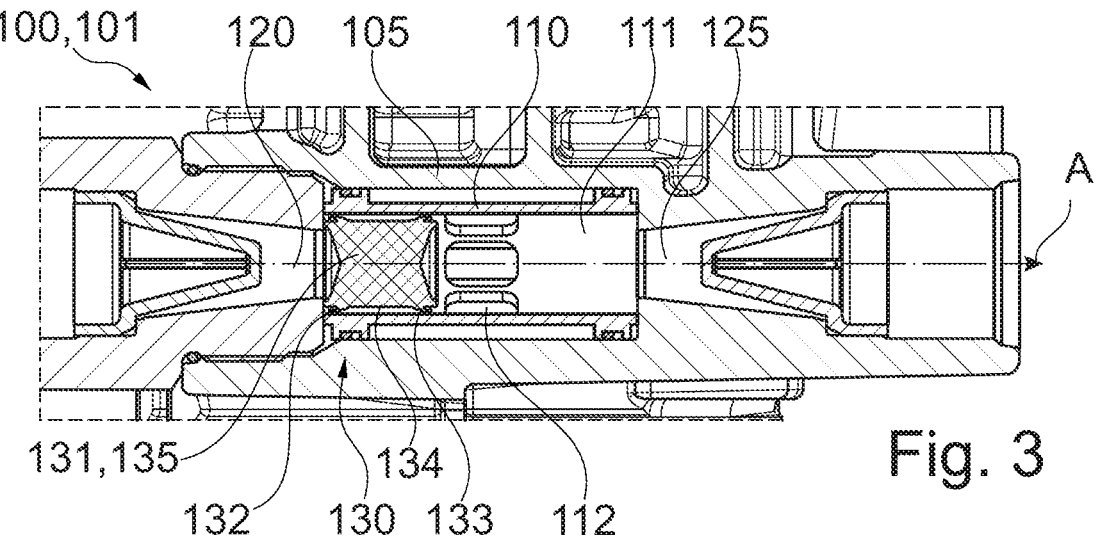
FIG. 3 is a cross-sectional view of a valve with a shuttle member and a lip seal according to an embodiment of the present disclosure.

FIG. 3 shows a cross-sectional view of a valve 100 according to an embodiment of the present disclosure. The valve 100 is a valve 100 for a pneumatic system 250 of a vehicle 200*a*, 200*b*. Such a vehicle 200*a*, 200*b* and pneumatic system 250 is described with reference to FIG. 1. FIG. 3 is described under reference to FIG. 1.

The valve 100 of FIG. 1 is a double check valve 101.

The valve 100 includes a body 105 and a cylinder 110. The cylinder 110 is arranged within the body 105.

The valve 100 includes a pressure supply port 120, a second supply port 125 and a control section 112. Each of the supply port 120 and the second supply port 125 is a pressure supply port 120, 125 and adapted to inject pressurized air 150 (FIG. 1) into the cylinder 110. Each of the supply port 120 and the second supply port 125 includes a nozzle (not indicated) to concentrate the application of pressurized air 150.

The cylinder 110 defines an axial direction A. In the axial direction A, the cylinder 110 is arranged between the supply port 120 and the second supply port 125. The control section 112 is arranged, in the axial direction A, in a middle section (not indicated) of the cylinder 110, i.e., between the supply port 120 and the second supply port 125.

The valve 100 includes a shuttle member 130 being movably arranged within the cylinder 110. The shuttle member 130 is adapted to move along the axial direction A. The movement of the shuttle member 130 is limited, in a radial direction, by the cylinder 110 and, in the axial direction A, by one or more end stops (not indicated) which may be provided by the supply ports 120, 125 and/or the body 105. Therein, the shuttle member 130 is adapted to be moved by the supply of the pressurized air 150. I.e., if more pressurized air 150 is supplied by the supply port 120, the shuttle member 130 is pushed away from the supply port 120 towards the second supply port 125. The shuttle member 130 is adapted to stop at the end stop near the second supply port 125 to close the second supply port 125. At this time, the shuttle member 130 unblocks the control section 112 through which the pressurized air 150 is delivered to the control room. Conversely, if more pressurized air 150 is supplied by the second supply port 125, the shuttle member 130 is pushed away from the second supply port 125 towards the supply port 120. The shuttle member 130 is adapted to stop at the end stop near the supply port 120 to close the supply port 120. At this time, the shuttle member 130 unblocks the control section 112 through which the pressurized air 150 is delivered to the control room.

Unlike the shuttle member 130' and valve 100' of FIG. 2, the shuttle member 130 of FIG. 3 includes a radial lip seal 132 being integrally formed with the shuttle member 130. The shuttle member 130 includes a second radial lip seal 133 being separated, in the axial direction A, from the lip seal 132. The lip seals 132, 133 are integrally formed with the shuttle member 130 and thus with cylinder surface 134 of the shuttle member. The lip seals 132, 133 and the cylinder surface 134 and/or the shuttle member 130 may be made of the same material. The shuttle member 130 is a one-piece elastic element 131 and made of rubber 135. The cylinder surface 134 and the lip seals 132, 133 may also be made from different materials which enable integrally forming the lips seals 132, 133 with the shuttle member 130, e.g., different plastic and/or rubber materials may be molded together.

Each of the lip seal 132 and the second lip seal 133 is circumferentially arranged and protrudes from a cylinder surface 134 of the shuttle member 130 towards the cylinder 110. The lip seals 132, 133 protrudes from cylinder surface 134 in a radial direction from the shuttle member 130 and contact an inner surface of the cylinder 111 and thus provide sealing.

The double check valve 101 of FIG. 3 with the integrated radial lip seals 132, 133 may replace the valve 100' as shown in FIG. 2 with o-rings 163'.

The double check valve 101 of FIG. 3 provides sealing with a single component. Instead of a shuttle valve 100' of FIG. 2 with a metal part 162', i.e., insert, the double check valve 101 of FIG. 3 is designed as a rubber element. In addition, instead of the separate two o-rings 163' of the shuttle member 130' of FIG. 2 received in circumferential recesses, the radial lip seals 132, 133 of the shuttle member 130 of FIG. 3 are integrated with the shuttle member 130.

LIST OF REFERENCE SIGNS (PART OF THE DESCRIPTION)

100 valve
101 double check valve
105 body
110 cylinder
111 inner surface
112 control section
120 supply port
125 second supply port
130 shuttle member
131 one-piece elastic element
132 lip seal
133 second lip seal
134 cylinder surface
135 rubber
150 pressurized air
200*a* vehicle
200*b* utility vehicle
250 pneumatic system
251 pneumatic braking system
A axial direction
100' valve

105' body
110' cylinder
111' inner surface
112' control section
120' supply port
125' second supply port
130' shuttle member
161' rubber part
162' metal part
163' o-ring
A' axial direction

What is claimed is:

1. A valve (100, 101) for a pneumatic system (250) of a vehicle (200*a*, 200*b*), wherein the valve (100, 101) comprises:
   a cylinder (110);
   a pressure supply port (120) that supplies pressurized air (150) to the cylinder (110); and
   a shuttle member (130) being movably arranged within the cylinder (110), wherein the shuttle member (130) is adapted to be moved by the supply of the pressurized air (150);
   wherein the shuttle member (130) includes a radial lip seal (132) integral with the shuttle member (130);
   wherein the cylinder (110) has an inner surface with a diameter that is constant between opposing ends thereof;
   wherein the shuttle is fully retained axially within the opposing ends of the cylinder (110) and does not project beyond the cylinder (110).

2. The valve (100) as claimed in claim 1, wherein the shuttle member (130) and lip seal (132) are part of a one-piece elastic element (131).

3. The valve (100) as claimed in claim 1, wherein
   the cylinder (110) defines an axial direction (A), and
   the shuttle member (130) includes a second radial lip seal (133) being separated, in the axial direction (A), from the lip seal (132).

4. The valve (100) as claimed in claim 1, wherein the lip seal (132) is circumferentially arranged and protrudes from a cylinder surface (134) of the shuttle member (130) towards the cylinder (110).

5. The valve (100) as claimed in claim 1, wherein the shuttle member (130) is made of rubber (135).

6. The valve (100) as claimed in claim 1, wherein the valve (100) is a double check valve (101).

7. The valve (100) as claimed in claim 3, wherein the lip seal (132), the second lip seal (133), and the shuttle member (130) are part of a one-piece elastic element (131).

8. The valve (100) as claimed in claim 7, wherein the one-piece elastic element (131) is made entirely of rubber.

9. The valve as claimed in claim 4, wherein the lip seal (132) projects radially outward from the cylinder surface (134) toward an inner surface (111) of the cylinder (110) and into sealing contact with the inner surface (111).

10. The valve (100) as claimed in claim 4, wherein the cylinder surface (134) and the lip seal (132) are different materials integrally molded together.

11. The valve (100) as claimed in claim 4, wherein the cylinder surface (134) and the lip seal (132) are a one-piece elastic element (131) of the same material.

12. The valve (100) as claimed in claim 1, wherein shuttle member (130) does not include a metal core.

13. The valve (100) as claimed in claim 1, wherein the shuttle member (130) does not include o-rings.

14. A pneumatic system (250) for a vehicle (200*a*, 200*b*), comprising:

the valve (100) as claimed in claim 1.

15. The pneumatic system (250) as claimed in claim 14, wherein the pneumatic system (250) is a pneumatic braking system (251).

16. A vehicle (200*a*, 200*b*) comprising:

the pneumatic system (250) as claimed in claim 14.

17. A valve (100, 101) for a pneumatic system (250) of a vehicle (200*a*, 200*b*), wherein the valve (100, 101) comprises:

a cylinder (110);

a pressure supply port (120) that supplies pressurized air (150) to the cylinder (110); and a shuttle member (130) being movably arranged within the cylinder (110), wherein the shuttle member (130) is adapted to be moved by the supply of the pressurized air (150);

wherein the shuttle member (130) includes a radial lip seal (132) integral with the shuttle member (130);

wherein the valve (100) is a double check valve (101);

wherein the shuttle member (130) and lip seal (132) are part of a one-piece elastic element (131);

wherein the cylinder (110) has an inner surface with a diameter that is constant between opposing ends thereof;

wherein the shuttle is fully retained axially within the opposing ends of the cylinder (110) and does not project beyond the cylinder (110).

\*   \*   \*   \*   \*